April 25, 1933.     R. A. CARLETON     1,905,439
ELECTRIC FLUID HEATING APPARATUS
Filed July 31, 1931     3 Sheets-Sheet 1

INVENTOR.

ROBERT A. CARLETON

BY Pennie, Davis, Marvin & Edmonds
ATTORNEYS

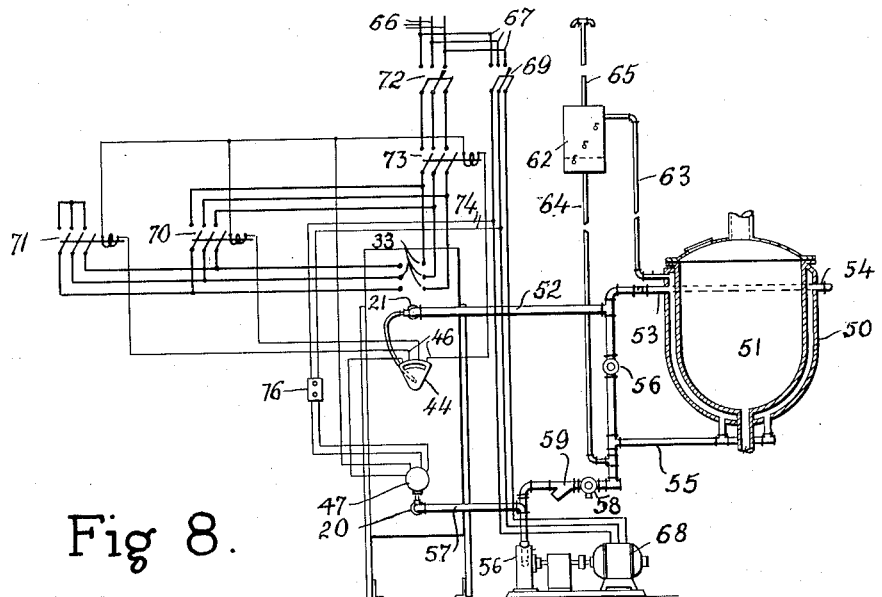

April 25, 1933.  R. A. CARLETON  1,905,439
ELECTRIC FLUID HEATING APPARATUS
Filed July 31, 1931  3 Sheets-Sheet 3

INVENTOR.
ROBERT A. CARLETON
BY Pennie, Davis, Marvin & Edmonds.
ATTORNEYS

Patented Apr. 25, 1933

1,905,439

UNITED STATES PATENT OFFICE

ROBERT A. CARLETON, OF BROOKLYN, NEW YORK, ASSIGNOR TO NATIONAL ELECTRIC HEATING CO., INC., OF NEW YORK, N. Y., A CORPORATION OF NEW JERSEY

ELECTRIC FLUID HEATING APPARATUS

Application filed July 31, 1931. Serial No. 554,258.

This invention relates to improvements in electric fluid heating apparatus for heating a circulating body of oil or other fluid and more specifically to an apparatus by means of which the fluid may be quickly and uniformly heated to the desired degree.

One of the objects of this invention is to provide an electric circulating fluid heater in which the fluid is heated by direct contact with a resistance heating element or elements which have a maximum area of heat transferring surface, and in which heat is generated evenly over their entire surface by the passage of an electric current, so that there is a high heat transfer rate between the heating surface and the fluid, at a relatively low temperature differential.

Another object of this invention is to provide a fluid heating apparatus through which the oil or other fluid to be heated is circulated to transfer the heat generated in the electric heater to heat utilizing or radiating means, such as jacketed kettles, pipe coils, etc.

A further object of the invention is to provide an electric fluid heating apparatus of the character specified, in which the electric current supplied to the heating elements is controlled by thermostatic means subjected to the temperature of the fluid discharged from the apparatus.

A still further object of this invention is to provide an apparatus of the character specified with means operable by the flow of the fluid through the heater that will cause electric current to be supplied to the heating elements when the fluid is flowing and prevent the supply of electric current thereto upon substantial cessation of said flow.

Yet another object of this invention is to provide an electric circulating fluid heater of the character described, which is simple and rugged in construction and arrangement, constructed of non-corrosive materials not easily affected by chemical or other action of the fluid being heated, that can be produced at low cost for either domestic or industrial purposes of either large or small capacities, that will be durable in service, that will operate efficiently and economically, and that can be arranged to operate from an alternating or direct electric current of any desired voltage or characteristic.

The present invention contemplates the provision of an electric heating apparatus through which the fluid to be heated is caused to circulate, between and in direct contact with heating elements which consist of parallel, narrowly spaced strips of high resistance material, and which are uniformly heated by the passage of an electric current therethrough, said high resistance heating elements presenting maximum heating surface areas. On account of the high efficiency of heat absorption due to the large surface presented by the heating elements and narrow spacing between them in which the fluid is to be heated is caused to circulate at considerable velocity, the heating elements may be operated at a relatively high rate of heat input.

The heating elements which are also resistance elements are arranged in parallel relation with the current flowing in opposite directions in alternate elements and by this construction the self induction of the resistance elements is neutralized and the power factor is not reduced by having the current and voltage out of phase. This greatly increases the efficiency of operation of the device.

These and other features of the invention will more fully appear from the following description, and will be particularly pointed out in the claims.

Preferred forms of apparatus embodying the invention, are illustrated in the accompanying drawings, in which Figure 1 is a vertical view partly in section of an electrical heating apparatus particularly designed for heating a flowing stream of liquid.

Figures 4, 5, 6 and 7 are enlarged details showing the preferred method of supporting and shaping the high resistance metallic ribbons.

Figure 8 illustrates an arrangement of apparatus to heat a jacketed kettle.

Figure 1:
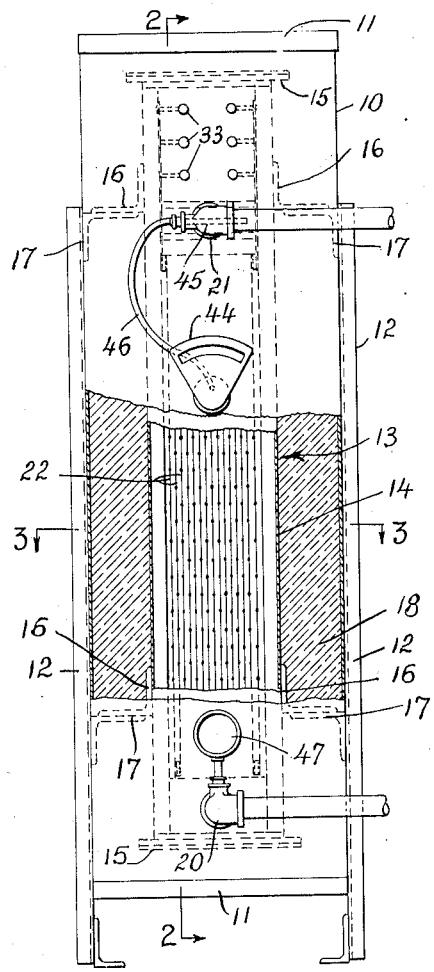

It will be understood that this invention is not limited to the uses or arrangements shown in the drawings, but that they may be readily modified within the scope of this invention to provide an efficient circulating type of heater for the heating, evaporation or treatment of various chemicals and liquids and for many other useful applications in various industrial processes.

The apparatus illustrated in Figures 1 to 7, while generally applicable to heating fluids, is primarily designed to heat a flowing stream of oil to a relatively high temperature. It comprises a rectangular shell 10 of heavy sheet metal or the like which is closed at the top and bottom by metal ends 11 and is supported by means of angle iron supports 12 fastened to the sides thereof and adapted to rest upon the floor. Within the shell 10 a tank 13 of somewhat smaller dimensions is supported. The tank 13 comprises a rectangular metal shell 14 closed at the ends by covers 15 tightly sealed thereto. Several angular supporting members 16 are affixed to the tank 13 and support the tank 13 in place in the shell 10 by resting upon similar supporting members 17 mounted on the inside of the shell. The tank is preferably of corrosion resistant metal or is lined with some metal which will resist the action of the chemicals contained in the fluid to be treated. The space between the tank and the shell is filled with heat insulating material 18 in order to prevent the loss of heat from the tank. The tank 13 is provided with an inlet pipe 20 near its bottom end and an outlet pipe 21 a slight distance below the upper end, both of which extend through the insulating material and outer shell.

The heating elements comprise a plurality of thin metallic ribbons or strips 22 which have a relatively high electrical resistance and also a high resistance to corrosion or attack by chemicals. Such metals as nichrome and the like have been found well adapted to this use. Groups of heating elements extend lengthwise of the tank between pairs of parallel insulating plates 23 and 24 to form heating units.

Each unit comprises a plurality of heating elements 22 held between a pair of insulating plates 23 and 24 and forming with the insulating plates a number of small channels 25 as shown in Figure 7 through which the oil is caused to flow. The strips 22 are held in an edgewise position between the insulating plates 23 and 24 by means of split pins 26 which extend through holes 27 in the insulating plates 23 and 24 and straddle the heating strips 22 with the split portion. The insulating plates 23 and 24 are held in spaced relation by means of insulating blocks 28 which space them the proper distance apart and bolts 29 which extend through the insulating plates 23 and 24 and the insulating blocks 28 to hold them together.

Insulating sheets 30 lie between adjacent heating elements and separate and insulate them. Similar insulating sheets lie between the heating units and the tank wall. The insulating material used is preferably transite, mica, or the like, but may be any of the known insulating materials which will withstand the heat and chemical action.

The heating strips of each unit are preferably all in one piece and are merely bent at the ends so that they connect and yet allow the free passage of fluid.

The ends of the high resistance strip 22 are welded or otherwise electrically connected to U-shaped pieces 31 fastened to insulating plate 24. Connections of copper 32 or other suitable, relatively low resistance electric conducting material are welded or otherwise connected to the other arm of U-shaped pieces 31 and extend to and are connected to terminal studs 33 which extend through the wall of receptacle 13 by means of oil tight electrical insulating bushings 34.

In the drawings three units of heating elements are shown located in the tank between the inlet and outlet. Barriers 40, 41 and 42 direct the passage of fluid through the units so that the fluid follows a sinuous path through the tank, all of the fluid passing through each one of the units.

The fluid is introduced under pressure into the inlet pipe 20 by means of a pump or other suitable pressure producing means (not shown in Figs. 1 to 7). The current of fluid flows progressively through the units in the tank and is heated by direct contact with the resistance elements during its progress and is delivered thru the outlet pipe 21.

The fluid which is discharged through the outlet pipe 21 is kept at a predetermined temperature by providing a means which regulates the amount of electric current flowing through the resistance elements in accordance with the temperature of the fluid being discharged from the outlet pipe 21.

In the construction illustrated, a thermostatic device 44 is provided with a sensitive bulb 45 which extends into the outlet pipe 21 and is exposed to the temperature of the fluid therein so as to operate the thermostat in accord with the temperature therein. The thermostat 44 acting by means of control wires 46 operates the necessary mechanism (not shown in Figs. 1 to 7) to vary the amount of electric current supplied to the heating elements.

Figure 2:
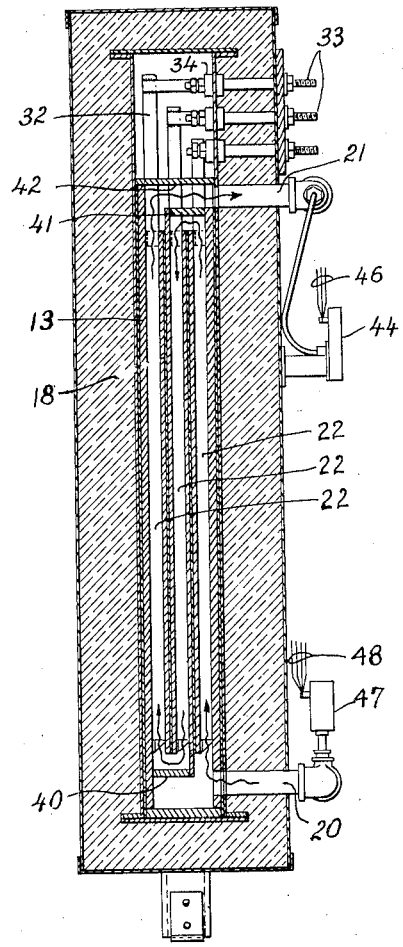
Figure 2 is a vertical sectional view on line 2—2 of Figure 1.
Figure 3:
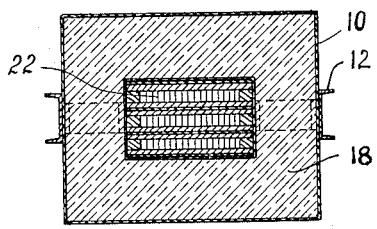
Figure 3 is a transverse horizontal view on line 3—3 of Figure 1.

Means are also provided to control the current in the heating elements so that current will be supplied only while oil is flowing through the heater. As illustrated in Figures 1 and 2 an automatic switch 47 is connected to the inlet pipe 4 so that it will be operated by the pressure of the fluid flowing through this pipe. The switch 47 controls the supply of electric current to the heating elements by means of control wires 48.

The heater is particularly adapted to heat oil or a similar fluid for circulation through the jacket of a jacketed kettle and it is shown connected for this use in Figure 8. In this figure the oil from the outlet pipe 21 of the heater is conveyed to the jacket 50 of a jacketed kettle 51, through piping 52. There are generally at least two inlets into the jacket as at 53 and 54. From the bottom of the jacket 50 piping 55 leads the oil to a pump 56 which returns it through piping 57 to the inlet pipe 20 of the heater.

In the oil piping 55 between the jacket and the pump is located a three way valve 58 through which the system may be filled with oil and also between this valve and the pump is a strainer 59 which strains the dirt and foreign matter from the oil.

A by-pass pipe 60 extends between the piping 52 and the piping 55 so that the oil may be by-passed around the kettle without passing through the jacket. A spring or weight closed valve 61 prevents this by-passing of the oil except when the pressure is excessive as it sometimes is when the system is just starting and the oil is cold and viscous. The valve 61 then allows the oil to circulate and become warm without straining the pump.

An expansion tank 62 is also provided which is connected near its top to the top of the jacket 50 by a pipe 63 and excess oil and vapors from the oil may thus escape from the kettle jacket 50 into the tank 62. Any excess of oil carried into the tank 62 is drained therefrom by a pipe 64 which connects with the piping 55 between the kettle jacket 50 and the pump 56. A pipe 65 extends upwardly from the tank 62 and allows the vapors to escape to the air.

The system is operated electrically from a source of three-phase electric current, not shown, through the main line 66. A branch 67 from this main line operates a motor 68 which drives the pump. A three pole single throw switch 69 is shown as controlling the motor circuit. Each of the three wires of the main line 66 are connected to one end of each of the three heater units and the other ends of the heater units are each connected to one of the poles of a single throw three-pole magnetic switch 70 which when closed connects these ends back to the main line in such a way that the three heater units form a delta connection across the main line.

Another triple pole single throw magnetic switch 71 is connected so that when closed it connects together all of the wires leading from the heater units to the switch 70. When this switch is closed and switch 70 is open the heater units form a Y connection across the main line and this causes a reduced amount of current to flow through the circuit.

A hand-controlled triple pole single throw switch 72 is located so as to break the main line and prevent current from reaching the heater units and a magnetically controlled switch 73 is in series therewith and performs the same function automatically.

The magnetic control is operated by current taken from the motor supply line 67 by the wires 74 which lead to the control switch 47 which is operated by the pressure in the inlet pipe 20 occasioned by the flow of oil therein. When oil is flowing this switch is closed and wires 74 are connected to the pair of wires 75 one of which is connected to each of the magnetic switches 70, 71 and 73 and the other of which is connected to the control switch 44 which in turn is connected by wires 46 to the magnetic switches 70, 71 and 73. As the temperature rises the control switch 44 opens the switch 70 and closes the switch 71 so as to change the connections in the heater from delta to Y in form and finally if the temperature rises too high the control switch 44 opens the main magnetic switch 73, completely stopping the current supply. As the temperature decreases the control switch 44 first closes the main magnetic switch 73, then the magnetic switch 71 and finally opens the magnetic switch 71 and closes the magnetic switch 70, thus attaining the highest possible current flow. A push button switch 76 may conveniently be used to break the control circuit in the supply wire 75 so that the heating current will be shut off.

Figure 9:
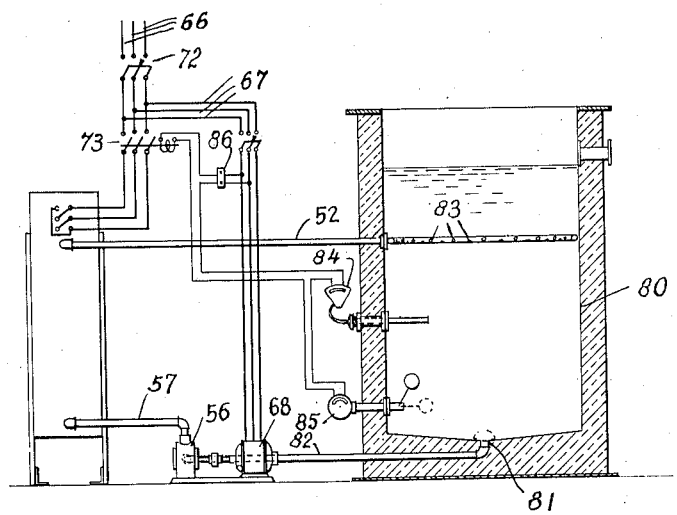
Figure 9 illustrates an arrangement of apparatus for directly heating the fluid.

The heater which is the subject of this invention is also adapted for use in heating a fluid in an open tank and is shown so used in Figure 9. In this figure the fluid in a tank 80 is to be heated and this fluid is withdrawn through a drain 81 in the bottom of the tank, which drain is connected to a pipe 82 leading to a pump 56, through piping 57, through the heater and through piping 52 which returns it to the tank. A perforated ring of pipe 83 may be attached to the piping 52 inside the tank 80 so as to disperse the heated fluid inside the tank.

The heating units are supplied with current from a main line 66 through a hand-operated switch 72 and a magnetically operated switch 73. As shown in Figure 9 there is no provision for changing the connections between the heating units and the heating units are permanently connected in delta form. Wires 67 lead from the main line 66 and supply current to a motor 68 which drives the pump 56. Current is taken from the motor supply line to operate the magnetic switch 73, by connecting it across one phase of the motor supply line, in series with a thermostatically operated switch 84 and a switch 85 which is operated by the level of the liquid in the tank. Thus, whenever the liquid in the tank reaches a maximum temperature the switch 73 is opened or whenever the liquid falls below a predetermined level the switch 73 is opened, in either case stopping the supply of current to the heating units. A switch 86 is also located in circuit with the magnet of the magnetic switch and serves to open the circuit to cause the current supply to be cut off.

Figure 10:
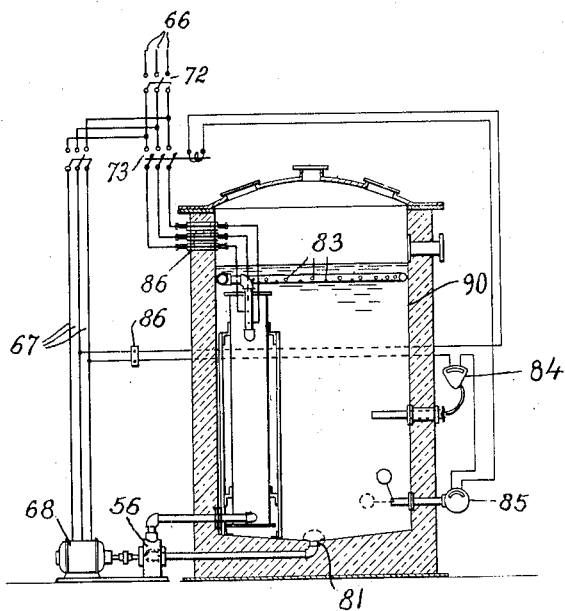
Figure 10 illustrates still another arrangement for directly heating the fluid under high pressure.

In case it is desired to conserve heat energy still further or to use particularly high pressures, the heater itself may be located inside a pressure chamber 90 as shown in Figure 10. The connections and the operation however are exactly the same when the heater is so located and therefore need not be described in detail.

While I have described the preferred way in which my heater may be manufactured and several preferred modes of using the heater, it is to be understood that these are merely examples and that many obvious variations may be made within the scope of this invention.

While I have described a particular means for regulating the amount of current supply to the heating units by changing the connections therebetween it is obvious that the use of a variable ratio voltage regulator or a transformer or other means to deliver electric current to the heater at the desired rates are within the scope of this invention.

One of the essential features of this invention is the extremely rapid and efficient heat transfer which is possible on account of using an electric heating element in the form of a thin ribbon which provides a maximum of surface area and circulating the fluid past the surface at a relatively high velocity and in relatively small streams.

In a heating apparatus, as is well known, the rate of heat absorption by fluids is governed by the following approximate conditions: (1st) It is directly proportional to the difference in temperature between the heating surface and the material being heated and in contact therewith. (2nd) It is proportional to the one-half power of the velocity or flow of the fluid past the said heating surfaces. (3rd) It is the reciprocal of the square of the distance the heat is to be transmitted or the thickness of the column of liquid being heated. Of the above three conditions, the 2nd and 3rd are the more important, the greater the velocity of flow and smaller the cross sectional area of the flowing stream of liquid exposed to the heating surface, other conditions being equal, the quicker and more uniformly will the liquid become heated.

Having thus described my invention I claim:

1. A fluid heating apparatus comprising a fluid containing receptacle having an inlet and an outlet, a chamber having narrowly spaced parallel walls of electric insulating material, a plurality of thin metallic strips of high electrical resistance arranged in substantial parallelism, narrowly spaced apart and edge supported between said walls to provide a plurality of rectangular conduits of small cross sectional area for the fluid, means for supplying an electric heating current to pass through said high resistance strips, means for causing the fluid to pass through said conduits in a predetermined direction and in direct contact with said high resistance strips.

2. A fluid heating apparatus comprising a fluid containing receptacle having an inlet and an outlet, a plurality of chambers having narrowly spaced parallel walls or electric insulating material, a plurality of thin metallic strips of high electrical resistance arranged in substantial parallelism therein, narrowly spaced apart and edge supported between said walls to provide a plurality of conduits of small cross sectional area for the fluid, ends of said chambers communicating with the ends of said receptacle, means for supplying an electric heating current to pass through said high resistance strips, means for causing the fluid to flow through said conduits in a predetermined direction and in direct contact with said high resistance metallic strips.

3. A fluid heating apparatus comprising a fluid containing receptacle having an inlet and an outlet, a plurality of chambers having narrowly spaced parallel walls of electric insulating material, a plurality of thin, metallic strips of high electric resistance arranged in substantial parallelism therein, narrowly spaced apart and edge supported between said walls to provide a plurality of conduits of small cross sectional area, means connecting adjacent ends of said chambers to form a continuous sinuous conduit with the ends of said conduit communicating with the respective ends of said receptacle, means for supplying an electric heating current to pass through said high resistance strips, means for supplying fluid to one end of said receptacle, means for causing the fluid to flow through said continuous conduit in direct contact with said high resistance metallic strips and means for delivering the fluid from the other end of said receptacle.

4. A fluid heating apparatus comprising a fluid containing receptacle having an inlet and an outlet, a plurality of parallel, thin, edge supported metallic strips of high electrical resistance narrowly separated from one another to provide a plurality of conduits of small cross sectional area for the fluid, means for causing an electric heating current to pass through said strip, means for supplying fluid to one end of said receptacle, means for causing the fluid to flow through said conduits in direct contact with said high resistance strips and thermostatic means subject to the influence of substantially the maximum temperature of said fluid operable to control the electric heating current supplied to said high resistance strips.

5. A fluid heating apparatus comprising a fluid containing receptacle having an inlet and an outlet, a plurality of parallel, thin, edge supported metallic strips of high electrical resistance narrowly separated from one another to provide a plurality of conduits of small cross sectional area for the fluid, means for causing an electric heating current to pass through said high resistance strips, means for causing the fluid to pass through said conduits in direct contact with said high resistance strips and means automatically operable by the flow of fluid through said conduits to cause the electric current to be supplied to said high resistance strips and to prevent supply of said current upon substantial cessation of said flow.

6. A fluid heating apparatus comprising a fluid containing receptacle having an inlet and an outlet, a plurality of parallel, thin, edge supported metallic strips of high electrical resistance narrowly separated from one another to provide a plurality of conduits of small cross sectional area for the fluid, means for causing an electric heating current to pass through said high resistance strips, means for causing the fluid to pass through said conduits in direct contact with said high resistance strips, thermostatic means subject to the influence of substantially the maxium temperature of said fluid operable to control the electric heating current supplied said high resistance strips and means automatically operable by the flow of fluid through said conduits to cause the electric heating current to be supplied to said high resistance strips and to prevent supply of said current upon substantial cessation of said flow.

7. A heating apparatus comprising a closed fluid containing receptacle, an electric fluid heater within said receptacle, comprising a casing, a plurality of parallel thin edge-supported metallic strips of high electrical resistance therein, narrowly separated from one another to provide a plurality of conduits of small cross-sectional area for the fluid and electrical connections whereby electric current may be passed through the strips; means for circulating the fluid in said receptacle through said electric fluid heater whereby the fluid within said receptacle will become heated.

8. A heating apparatus comprising a closed fluid containing receptacle having an inlet and an outlet, an electric fluid heater within said receptacle, comprising a casing, a plurality of parallel thin edge-supported metallic strips of high electrical resistance therein, narrowly separated from one another to provide a plurality of conduits of small cross-sectional area for the fluid and electrical connections whereby electric current may be passed through the strips; means for circulating the fluid in said receptacle through a closed circuit comprising said receptacle and said electric fluid heater whereby the fluid within said receptacle will become heated, thermostatic means subjected to the temperature of the fluid within said receptacle to regulate the electric heating current supplied said electric fluid heater.

9. A heating apparatus comprising a closed fluid containing receptacle, an electric fluid heater within said receptacle, comprising a casing, a plurality of parallel thin edge-supported metallic strips of high electrical resistance therein, narrowly separated from one another to provide a plurality of conduits of small cross-sectional area for the fluid and electrical connections whereby electric current may be passed through the strips; means for circulating the fluid in said receptacle through said electric fluid heater whereby the fluid within said receptacle will become heated, thermostatic means subjected to the temperature and the fluid within said receptacle to regulate the electric heating current supplied said electric fluid heater, and means automatically operable by the height of the fluid in said fluid containing receptacle to cause the electric heating current to be supplied to said electric fluid heater and to prevent the supply of said electric heating current when the liquid level in said receptacle reaches a predetermined minimum.

10. In a fluid heating system, a fluid heater comprising a casing, a plurality of parallel thin edge-supported metallic strips of high electrical resistance therein narrowly separated from one another to provide a plurality of conduits of small cross-sectional area for the fluid and electrical connections whereby electric current may be passed through the strips; a heat utilizing device having a compartment for fluid from the heater connected to the heater, a pump connected to return the fluid from the compartment to the heater, and a vapor discharge device comprising a tank connected near its upper end to the top of the fluid compartment and near its bottom end to the intake end of the pump and having a vent, opening to the outside.

In testimony whereof I affix my signature.

ROBERT A. CARLETON.